United States Patent
Knas et al.

(10) Patent No.: US 8,936,147 B2
(45) Date of Patent: Jan. 20, 2015

(54) PINCH ROLLER DRIVE

(71) Applicant: Dorner Mfg. Corp., Hartland, WI (US)

(72) Inventors: Jason M. Knas, Mukwonago, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 13/854,177

(22) Filed: Apr. 1, 2013

(65) Prior Publication Data

US 2013/0264176 A1  Oct. 10, 2013

Related U.S. Application Data

(60) Provisional application No. 61/621,015, filed on Apr. 6, 2012.

(51) Int. Cl.
*B65G 23/44* (2006.01)
*B65G 23/10* (2006.01)

(52) U.S. Cl.
CPC ............. *B65G 23/10* (2013.01); *B65G 23/44* (2013.01)
USPC .......................................... 198/814; 198/835

(58) Field of Classification Search
CPC ........ B65G 23/04; B65G 23/10; B65G 23/12; B65G 23/44; B65G 39/16
USPC .................... 198/835, 834, 832, 814
See application file for complete search history.

(56) References Cited

U.S. PATENT DOCUMENTS

| | | | | |
|---|---|---|---|---|
| 1,776,419 A | | 9/1930 | Dodge | |
| 2,875,888 A | * | 3/1959 | Swain et al. | 198/816 |
| 3,212,628 A | * | 10/1965 | Massey et al. | 198/311 |
| 3,937,338 A | * | 2/1976 | Cox | 414/528 |
| 4,875,568 A | * | 10/1989 | Hermann et al. | 198/335 |
| 4,878,772 A | | 11/1989 | Fukumoto et al. | |
| 5,341,909 A | * | 8/1994 | Ahls et al. | 198/335 |
| 5,427,221 A | * | 6/1995 | Spriggs et al. | 198/335 |
| 5,641,056 A | * | 6/1997 | Lem | 198/699.1 |
| 5,938,006 A | | 8/1999 | Fisher | |
| 6,726,532 B2 | * | 4/2004 | Lin et al. | 451/28 |
| 6,971,509 B2 | * | 12/2005 | Ertel et al. | 198/813 |
| 7,004,309 B2 | * | 2/2006 | Sherwood | 198/813 |
| 7,383,944 B2 | * | 6/2008 | Hall et al. | 198/860.3 |

* cited by examiner

*Primary Examiner* — Leslie A Nicholson, III
*Assistant Examiner* — Keith R Campbell
(74) *Attorney, Agent, or Firm* — Andrus Intellectual Property Law, LLP

(57) ABSTRACT

A conveyor assembly that includes a conveyor belt driven by a pinch roller drive assembly. The pinch roller drive assembly includes a pair of pinch rollers that are each rotatably mounted to a support housing. The pinch rollers are supported by a swing arm urged into a bias position by one or more bias springs. The pinch rollers and bias springs are part of a belt tension assembly mounted to the side rails of the conveyor assembly through mounting plates. The belt tension assembly can be pivoted to move the pinch rollers away from the drive roller as desired. In one embodiment, the roller drive assembly is mounted at or near the center of the conveyor assembly and can also support the drive motor. In an alternate embodiment, the pinch roller drive assembly is mounted to one end of the conveyor frame.

18 Claims, 14 Drawing Sheets

PINCH ROLLER DRIVE

CROSS-REFERENCE TO RELATED APPLICATION

The present application is based on and claims priority to U.S. Provisional Patent Application Ser. No. 61/621,015 filed on Apr. 6, 2012.

BACKGROUND

The present disclosure generally relates to a conveyor assembly. More specifically, the present disclosure relates to a miniature conveyor assembly having either a center drive assembly or an end drive assembly including a pinch drive.

Many different types of conveyor systems have been used to convey materials over either short or long distances. Different types of drive arrangements have been utilized in such conveyor systems. One type of drive assembly is an end drive in which the conveyor belt is driven by a drive roller at one end of the conveyor assembly. Alternatively, a center drive assembly is positioned near the center of the conveyor run and is utilized to drive the conveyor belt from the center location. Both the center drive assembly and end drive assembly have various advantages, many of which relate to the location of the drive motor.

Typically, a center drive assembly includes a center drive roller that provides the motive force to move the conveyor belt and thus move articles supported on the conveyor belt. Although center drive assemblies have many space advantages, center drive assemblies create issues concerning the feeding of the conveyor belt through the drive assembly and the transfer of the rotation of the drive roller to the conveyor belt.

SUMMARY

The present disclosure generally relates to a conveyor assembly and a drive assembly for a conveyor assembly for moving the conveyor belt. The drive assembly is mounted directly to the side rails of the conveyor to provide a miniature configuration for the entire conveyor assembly.

The conveyor assembly in accordance with the present disclosure includes a pair of spaced side rails that each extend between a first end and a second end. Each of the spaced side rails includes a mounting cavity that allows various components to be attached to the guide rails of the conveyor assembly. As is conventional, a conveyor belt is supported between the pair of side rails to move articles along the length of the conveyor assembly.

A drive roller is positioned to receive the conveyor belt and provide the motive force to move the conveyor belt along the length of the conveyor assembly. The drive roller can be rotated in either direction to control the direction of movement of the conveyor belt. In one embodiment of the disclosure, the drive roller is supported beneath the pair of side rails by a pair of mounting brackets that are each connected to one of the side rails. The drive roller is rotatable relative to the mounting bracket and is connected to a drive motor through a gear assembly. Rotation of the drive shaft of the drive motor imparts rotational movement to the drive roller to move the conveyor belt in the desired direction.

The conveyor assembly further includes a pair of belt tension assemblies that are supported along the length of the side rails. The belt tension assemblies each include a pinch roller and a bias member. When the belt tension assemblies are mounted to the side rails, the bias member of the belt tension assembly exerts a bias force on the pinch roller to press the pinch roller into contact with the drive roller. In this manner, the belt tension assemblies are able to increase the friction between the conveyor belt and the drive motor to aid in the drive roller imparting movement to the conveyor belt.

The belt tension assembly includes a support housing that receives a swing arm. A first end of the swing arm supports the pinch roller while a second end of the swing arm is pivotally mounted to the support housing of the belt tension assembly. A bias spring is positioned between the support housing and the swing arm to create the bias force to urge the pinch roller into contact with the drive roller when the belt tension assembly is mounted to the spaced side rails.

In one embodiment of the disclosure, the support housing of the belt tension assembly has a generally L-shape and is mounted to the support bracket at both an upper end and a lower end. When the upper end is disconnected from the support bracket, the support housing is pivotable about the lower end to move the pinch roller away from the drive roller. The entire belt tension assembly can be removed from the mounted position beneath the side rails by removing the connection at both the upper and lower ends of the support housing.

Each of the pair of belt tension assemblies are mounted to a mounting plate that in turn is supported on the mounting bracket that also supports the drive roller. The mounting plate can be disconnected from the mounting bracket to remove the pair of belt tension assemblies from contact with the drive roller as a single unit. The pair of mounting brackets that support the belt tension assemblies allow the pair of belt tension assemblies to be removed as a single unit for cleaning or to remove tension from the conveyor belt. In addition to allowing the pair of belt tension assemblies to be removed from the conveyor, the drive motor is also mounted to one of the mounting plates such that the drive motor is removed with the belt tension assembly.

In an alternate configuration of the disclosure, the drive assembly can be mounted at a first end of the spaced side rails. In such an embodiment, at least one belt tension assembly urges a pinch roller into contact with the chive roller to increase the friction between the drive roller and the conveyor belt.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
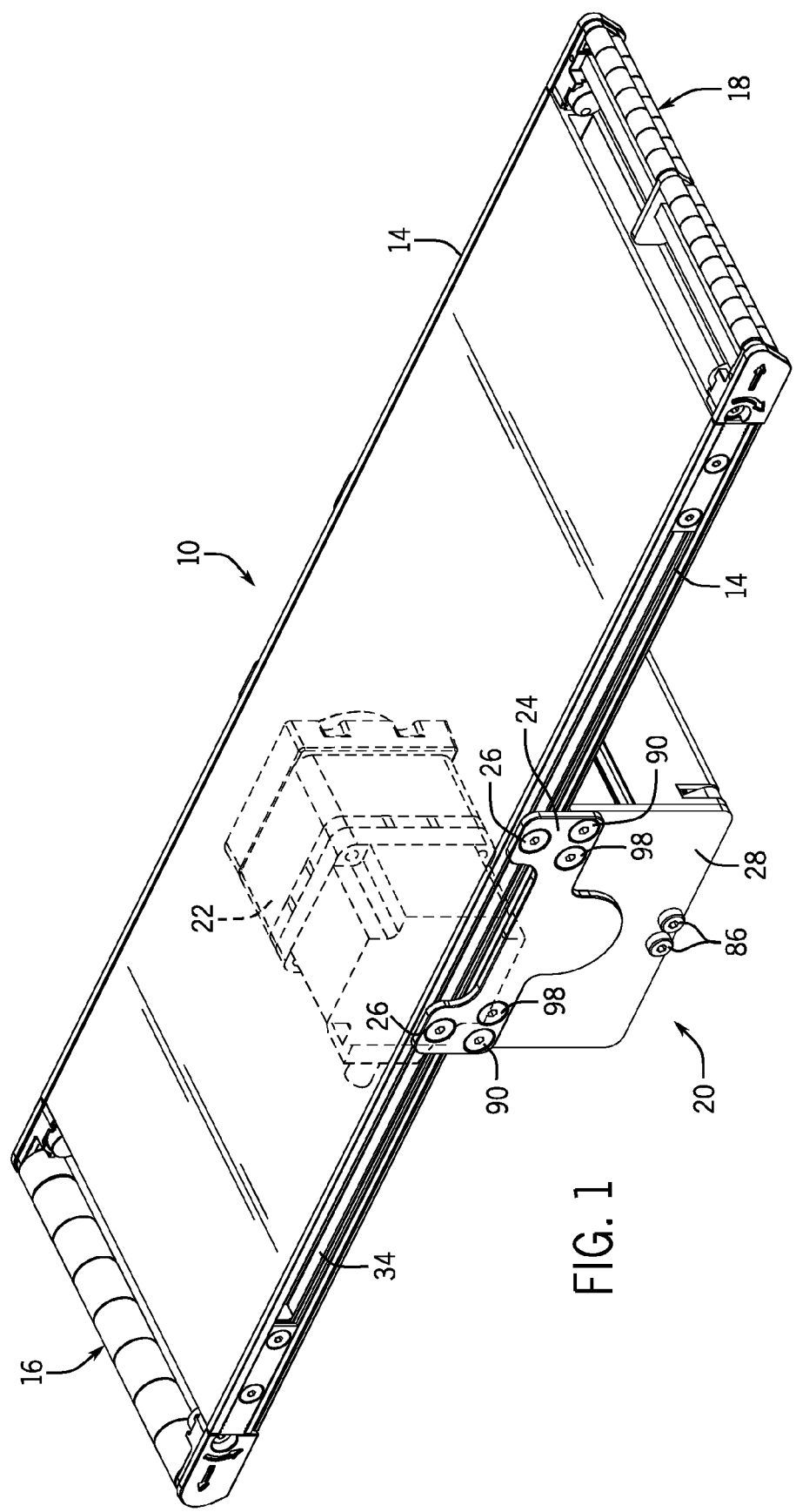
FIG. 1 is an isometric view of a conveyor assembly in accordance with the present disclosure.

FIG. 1 illustrates a miniature conveyor assembly 10 constructed in accordance with the present disclosure. The miniature conveyor assembly 10 includes a conveyor belt (not shown) positioned between a pair of spaced side rails 14 that extend between a first end 16 and a second end 18 of the conveyor assembly 10. In the embodiment shown in FIG. 1, a center mounted drive assembly 20 operates to move the conveyor belt in either direction to transport articles supported by the conveyor belt. The miniature conveyor assembly 10 shown in FIG. 1 is specifically designed to have a profile such that the conveyor assembly 10 can be utilized in various environments that have very tight space restrictions. As most clearly illustrated in FIG. 3, the side rails 14 have a height (A) of ¾ inch. Additionally, the overall height (14) of the conveyor assembly, from the conveyor belt to the bottom of the drive assembly 20, is approximately 2 inches. The drive assembly 20 shown in FIG. 3 has an overall width (W) of approximately 4 inches in the shown embodiment. Although various dimensions are shown and described in the present disclosure, it should be understood that the size of the various components of the miniature conveyor assembly 10 could be modified while operating within the scope of the present disclosure.

Figure 2:
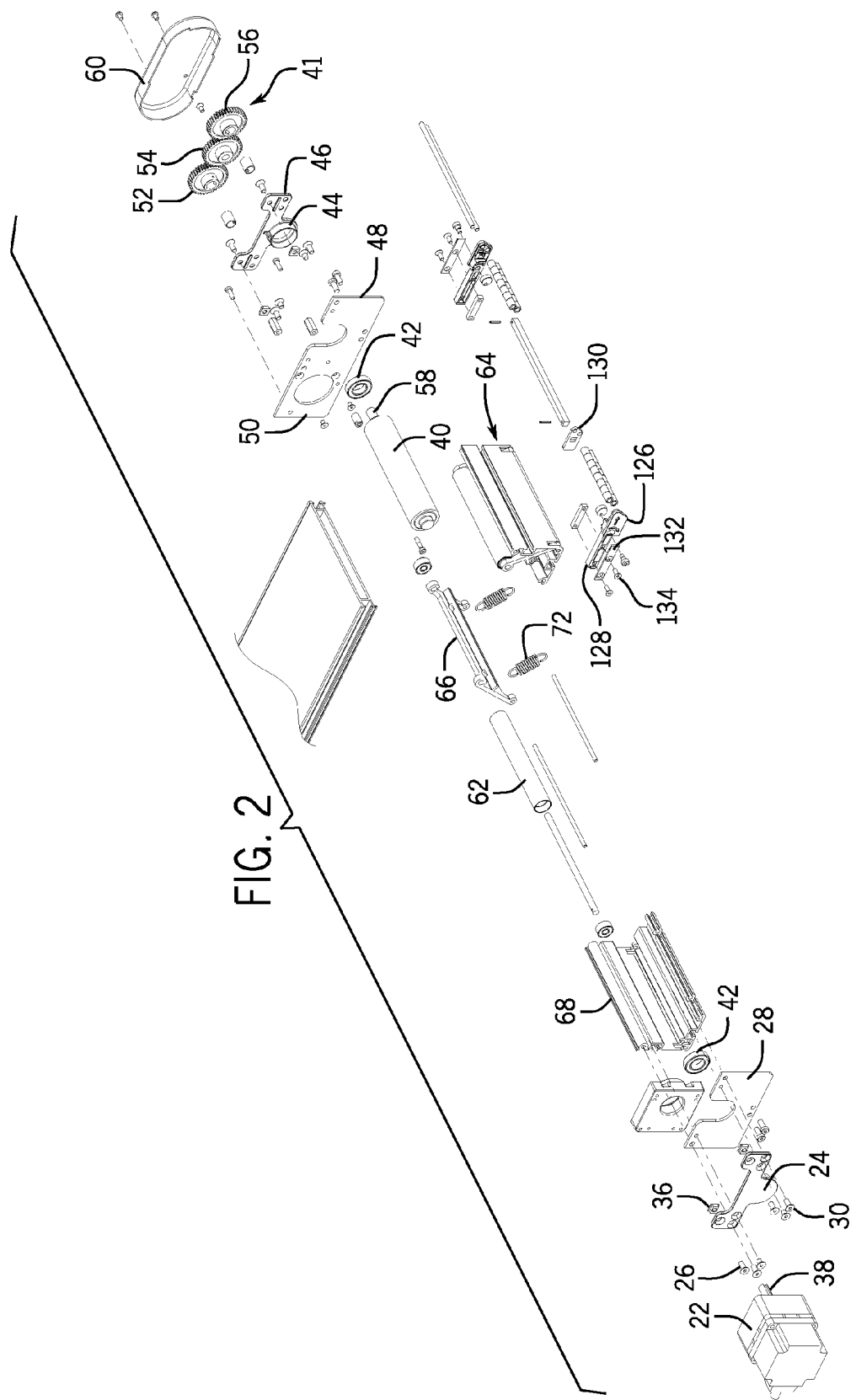
FIG. 2 is an exploded view of the conveyor assembly shown in FIG. 1.

As illustrated in FIG. 1, the center drive assembly 20 includes a drive motor 22 that is supported below and between the pair of spaced side rails 14, along with the drive assembly 20, by a mounting bracket 24. A mounting plate 28 is in turn attached to the mounting bracket 24 by a pair of connectors 98. As illustrated in FIG. 1, a pair of connectors 26 are used to attach the mounting bracket 24 within a mounting slot 34 formed in the side rail 14. As illustrated in FIG. 2, each of the connectors 26 are received within a support block 36 that is sized to be retained and received within the mounting slot 34 of the side rail 14.

Referring back to FIG. 2, the drive motor 22 includes a chive shaft 38 that drives a drive roller 40 through a gear assembly 41. The drive roller 40 is rotatably supported between the spaced mounting brackets 24, 46 by a pair of bearings 42. The end of the drive roller and one of the bearings 42 is received within a support cavity 44 formed in the opposite mounting bracket 46. During operation, the conveyor belt passes around the drive roller 40 such that rotation of the drive roller 40 causes the conveyor belt to move in the desired direction.

As illustrated in FIG. 2, a second mounting plate 48 is located on the opposite side of the conveyor frame and includes an extended portion 50 that is used to support the drive motor 22 in a side-by-side relationship. The drive shaft 38 of the drive motor 22 is received within a first gear 52 of the gear assembly 41, which in turn drives a second gear 54 and a third gear 56. The third gear 56 receives the shaft 58 of the drive roller 40 such that the rotation of the drive shaft 38 from the motor 22 is translated into rotation of the drive roller 40 through the meshed gear 52, 54 and 56. A cover 60 encloses the three gears 52, 54 and 56 of the gear assembly 41. Although the drive motor 22 is shown in a side mounted arrangement, it should be understood that the second mounting plate 48 could be reconfigured such that the extended portion 50 would be below or to the opposite side to mount the drive motor in different locations. In an embodiment in which the drive motor 22 is mounted below the drive roller 40, the series of gears 52, 54 and 56 would be rearranged to transmit the rotating motion from the drive shaft 38 to the drive roller 40.

Figure 5:
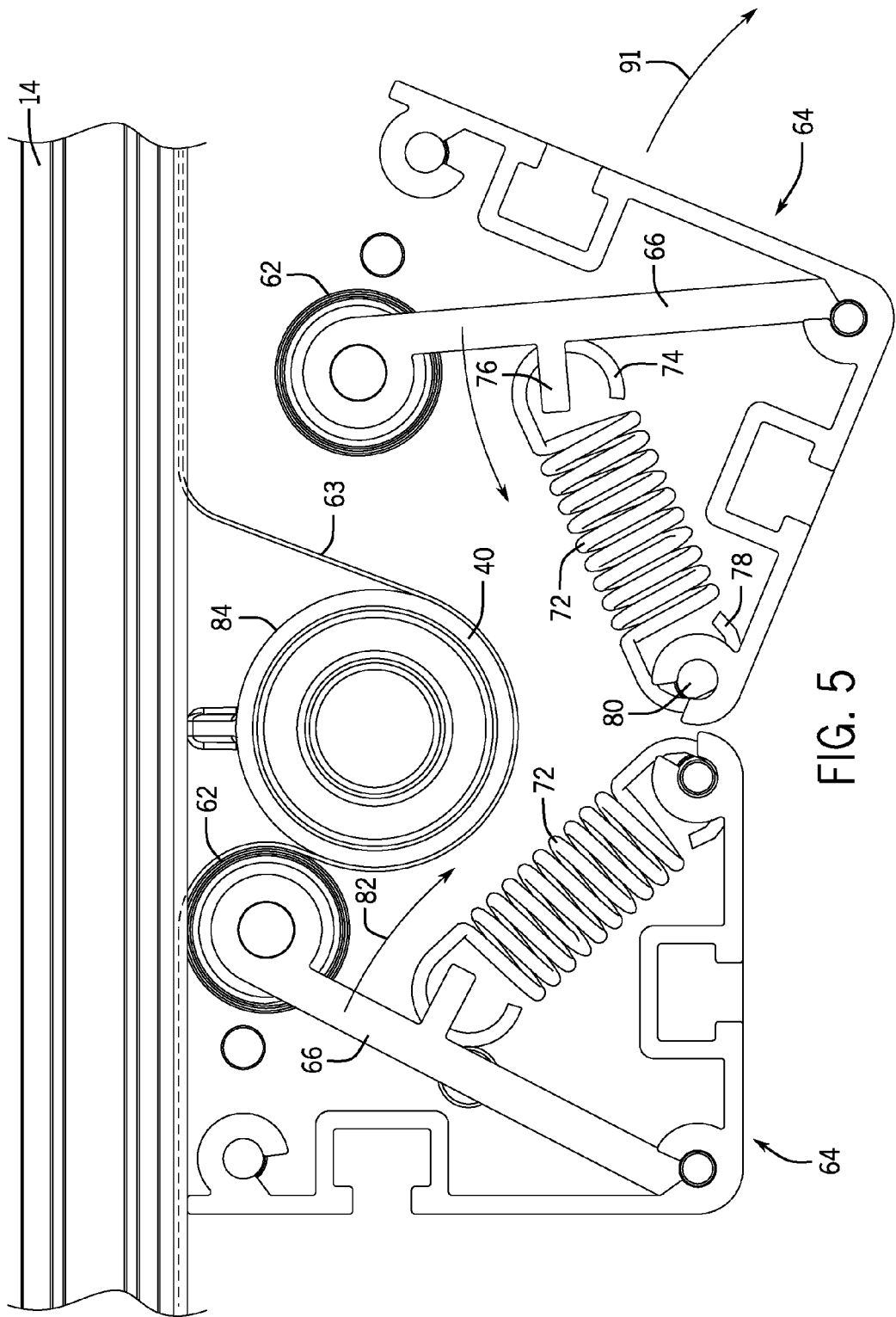
FIG. 5 is a side view illustrating the pinch roller drive assembly.
Figure 6:
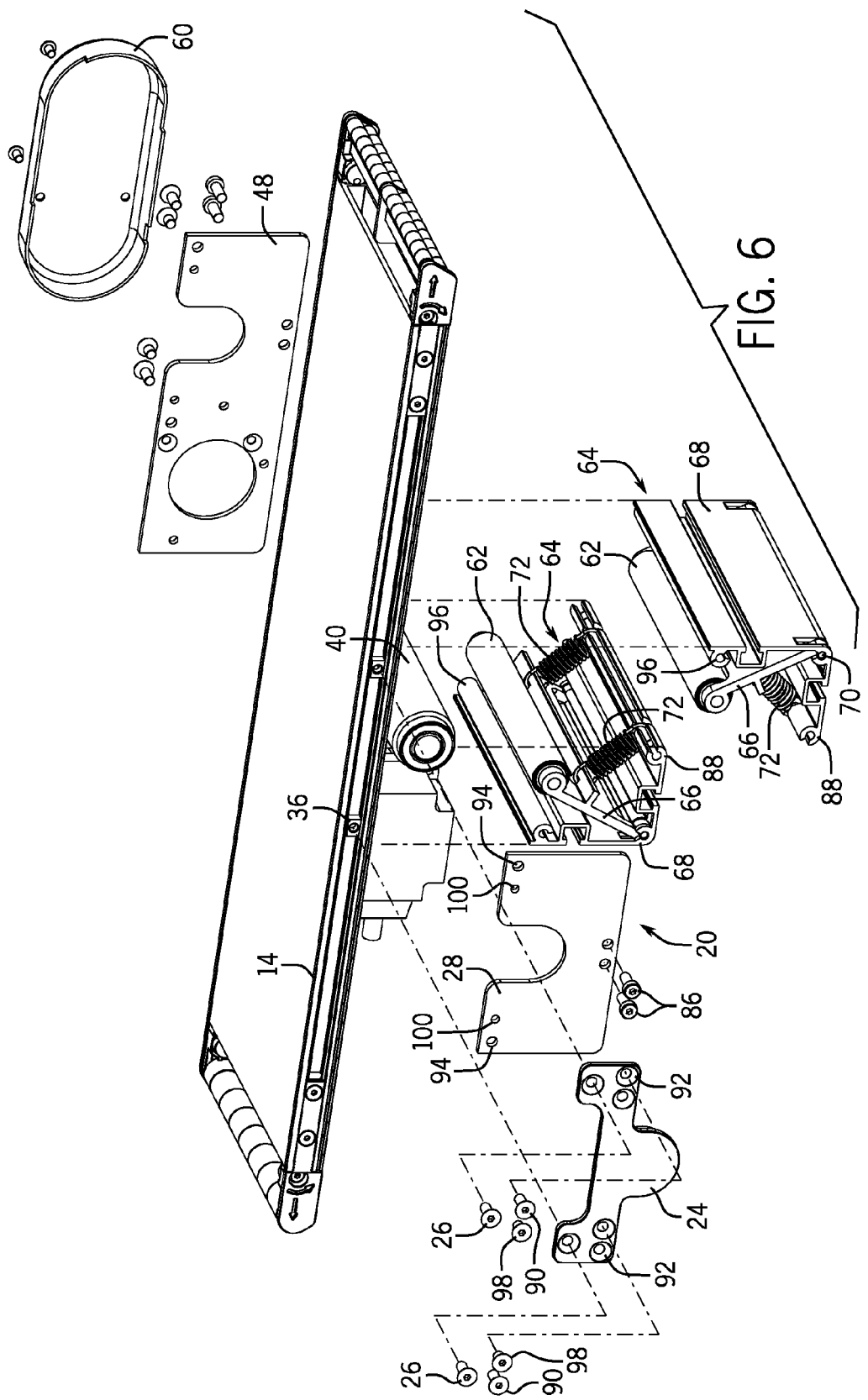
FIG. 6 is an exploded isometric view illustrating the pinch roller drive assembly iii its disassembled condition.

Referring now to FIGS. 5 and 6, the drive assembly 20 of the present disclosure includes pair of pinch rollers 62 that each engage the conveyor belt 63 to press the conveyor belt 63 into contact with the outer surface of the chive roller 40 to increase the friction between the conveyor belt and the outer surface of the drive roller 40. The pinch rollers 62 are each part of a belt tension assembly 64 that includes a swing arm 66 that is pivotally mounted to a support housing 68 at a pair of spaced pivot points. The belt tension assembly 64 further includes a pair of bias springs 72 that create a bias force that urge the pinch roller 62 toward the outer surface of the drive roller 40.

As illustrated in FIG. 5, each of the bias springs 72 includes a first end 74 that is connected to an attachment flange 76 extending from the swing arm 66. The second end 78 of the bias spring 72 is connected to a pivot rod 80 such that the compressive bias force created by the bias spring 72 urges the arms 66 in the direction shown by arrow 82 and into contact with the conveyor belt 12 to press the conveyor belt 12 into contact with the outer surface 84 of the drive roller 40.

Referring back to FIG. 6, each of the belt tension assemblies 64 is supported between the pair of spaced mounting plates 28 and 48. Specifically, a lower connector 86 passes through each of the mounting plates 28, 48 and is received within lower receiving cavity 88 while an upper connector 90 extends through one of the openings 92 in the mounting bracket 24 and an aligned opening 94 in the mounting plate 28 and ultimately received within an upper receiving cavity 96 formed in the support housing 68 of the belt tension assembly 64.

The mounting plate 28 is secured to the mounting bracket 24 by connectors 98 that each extend through an opening 100 in the mounting plate 28.

It should be understood in FIG. 6 that when the pair of belt tension assemblies 64 are mounted beneath the side rails 14, each of the individual belt tension assemblies 64 can be pivoted away from the drive roller 40 by removing the connectors 90 that are received in the upper receiving cavity 96. Once the connectors 90 are removed, the entire belt tension assembly 64 can pivot about the lower receiving cavity 88 and the associated connector 86. FIG. 5 illustrates the left belt tension assembly 64 pivoting away from the drive roller 40, as illustrated by arrow 91. When the tension assembly 64 pivots as shown in FIG. 5, the pinch roller 62 moves away from the drive roller 40 to release tension on the conveyor belt 63, as illustrated. In this manner, tension can be removed from the conveyor belt for cleaning.

Figure 7:
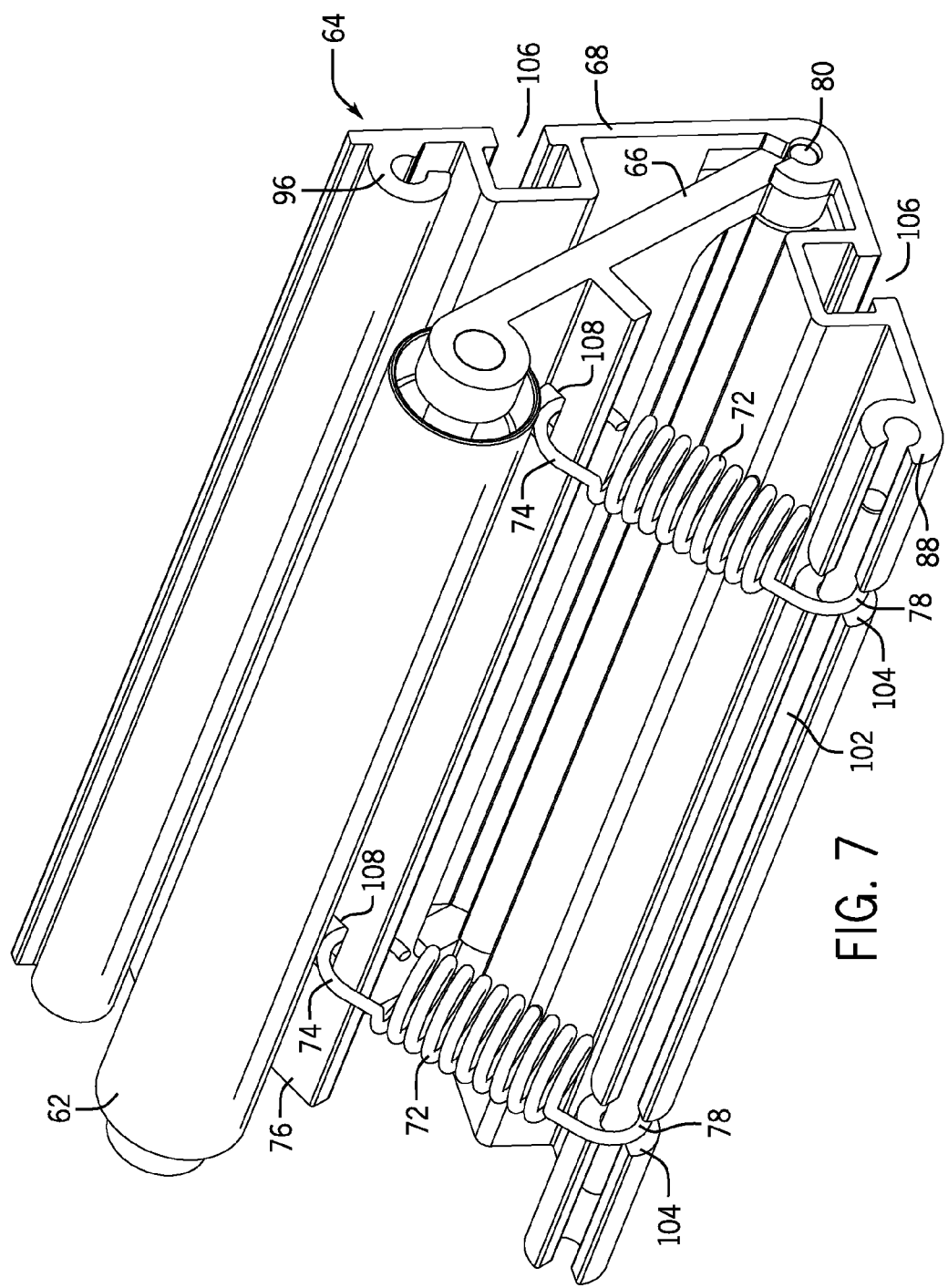
FIG. 7 is a magnified view of the bias assembly for one of the pinch rollers.

FIG. 7 illustrates the belt tension assembly 64 in a removed condition. As illustrated in FIG. 7, the belt tension assembly 64 includes the pinch roller 62 mounted between the spaced swing arms 66. A lower end of each swing arm 66 is mounted about a pivot rod 80 such that the arms 66 can pivot in the direction shown by arrow 82 in FIG. 5.

As further illustrated in FIG. 7, the second end 78 of each of the bias springs 72 is attached to a rod 102 that is received within the lower receiving cavity 88. In the embodiment shown in FIG. 7, the entire support housing 68 is formed from extruded aluminum such that the lower receiving cavity 88 can be formed as illustrated. After formation, a notch 104 is formed to receive the second end 78 of the bias spring 72. The extruded aluminum support housing 68 further includes the upper receiving cavity 96. In the embodiment illustrated, the support housing 68 includes a pair of mounting slots 106 that can receive a conventional T-connector.

As previously described, an attachment flange 76 receives the first ends 74 of each bias spring. An attachment notch 108 is formed in the flange 76 to receive the first end 74 of each bias spring 72.

Figure 8:
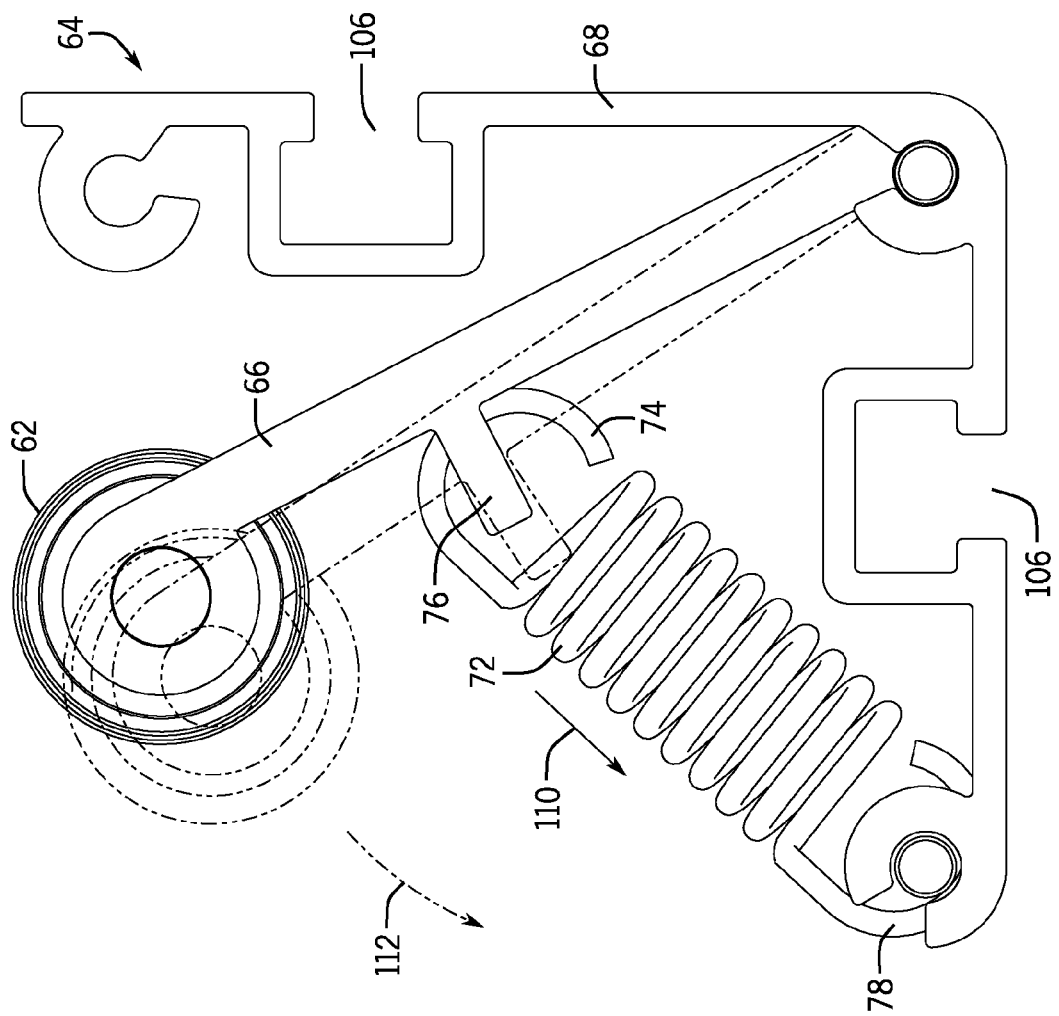
FIG. 8 is a side view illustrating the movement of the pinch roller against the bias force created by the bias spring.

FIG. 8 illustrates the pivoting, movement of the swing arm 66 and the rotatably mounted pinch roller 62 about the stationary support housing 68. As previously described, the bias spring 72 exerts a bias force illustrated by arrow 110 such that the pinch roller 62 is urged in the direction shown by arrow 112. When the swing arm assembly 64 is mounted beneath the conveyor frame, the bias force created by the bias spring 72 urges the pinch roller 62 into contact with the outer surface of the drive roller, as previously described.

Figure 3:
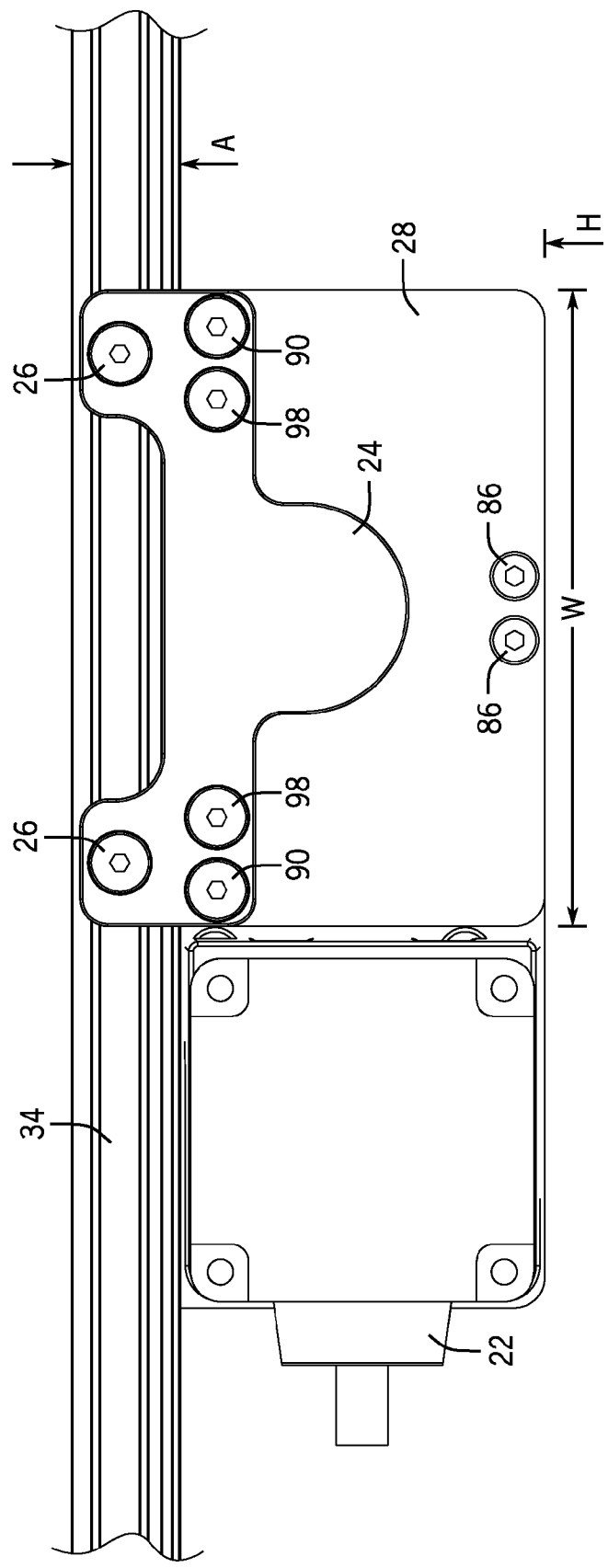
FIG. 3 is a side view of the drive assembly of the conveyor assembly.
Figure 4:
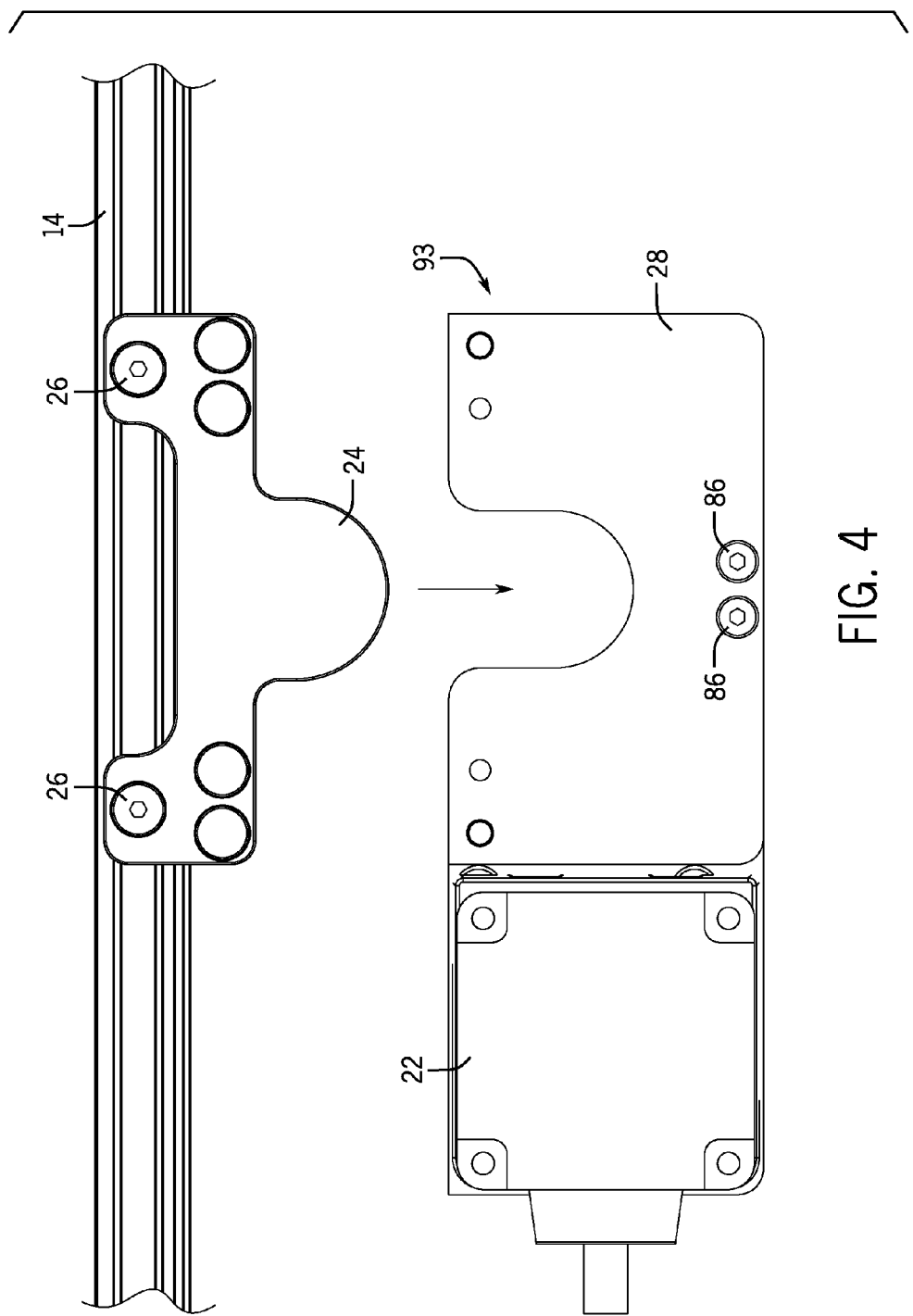
FIG. 4 is a side view similar to FIG. 3 with the mounting plate and belt tension assemblies separated from the conveyor frame.

In addition to the pivoting movement shown in FIG. 5, both of the belt tension assemblies can be removed from contact with the drive roller simultaneously to facilitate belt removal and/or changing. When the mounting plate 28 is supported on the mounting bracket 24 as shown in FIG. 3, the two pairs of connectors 90 and 98 can be removed. Once these connectors are removed, the mounting plate 28, along with the opposite mounting plate 48 (not shown) can be dropped down from the mounting bracket 24. Since the mounting bracket 24 and the opposite mounting bracket 46 support the drive roller, the drive roller remains in place beneath the side frames 14. Once the connectors are removed, the entire tension assembly 93 can be lowered. The tension assembly 93 includes the pair of mounting plates 28, 48 as well as the associated components of the pair of individual swing arm assemblies 64. Further, since the motor 22 is mounted to the mounting plate 48, the motor can also be removed with the tension assembly 93.

Figure 9:
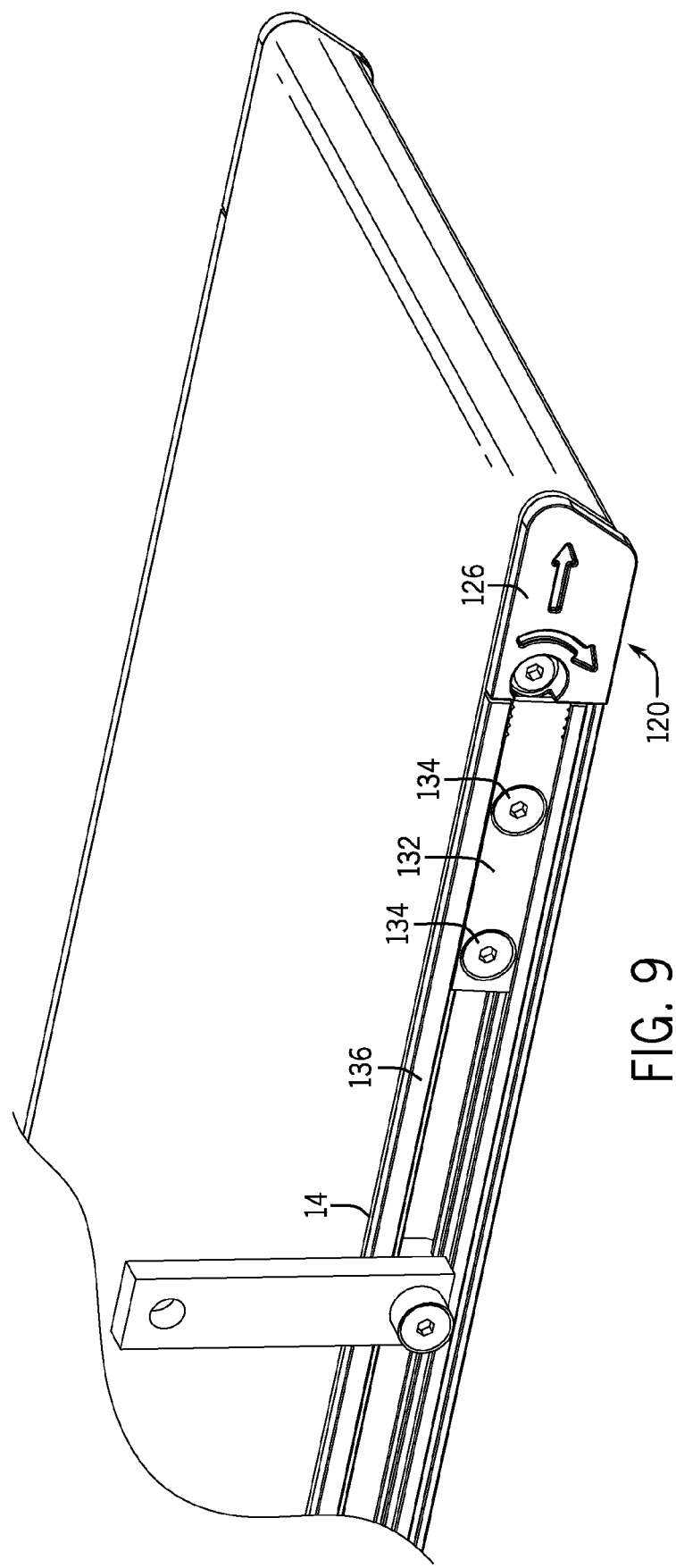
FIG. 9 is an isometric side view showing a flush idler tail.
Figure 10:
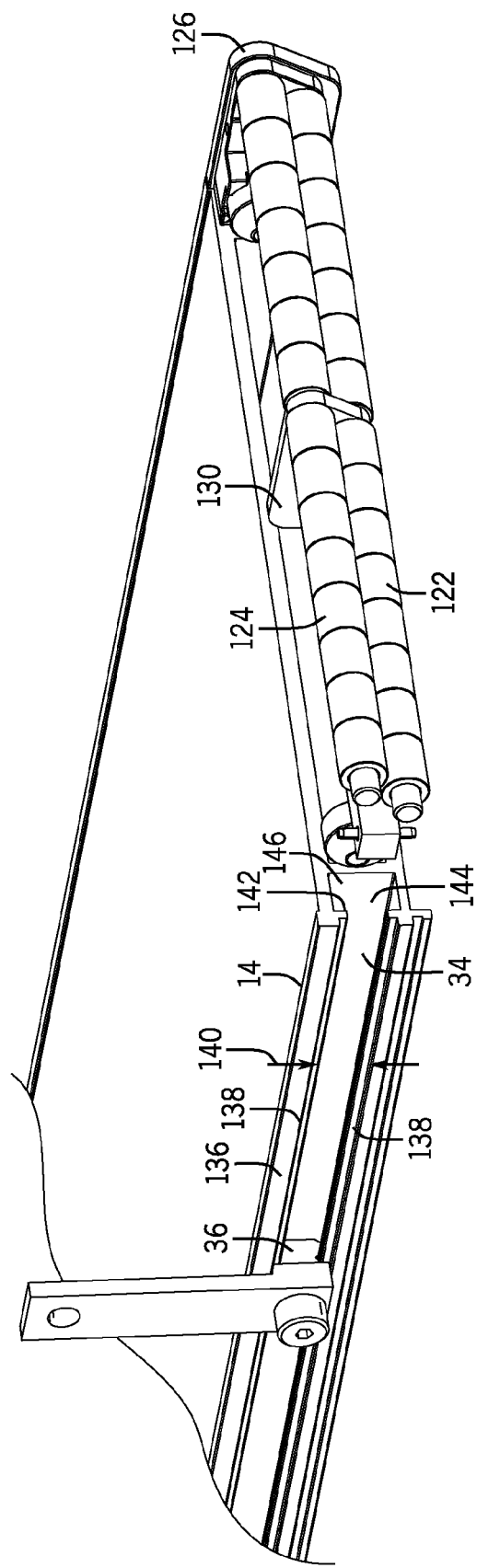
FIG. 10 is a view similar to FIG. 9 illustrating the configuration of the side rail and idler rollers.
Figure 11:
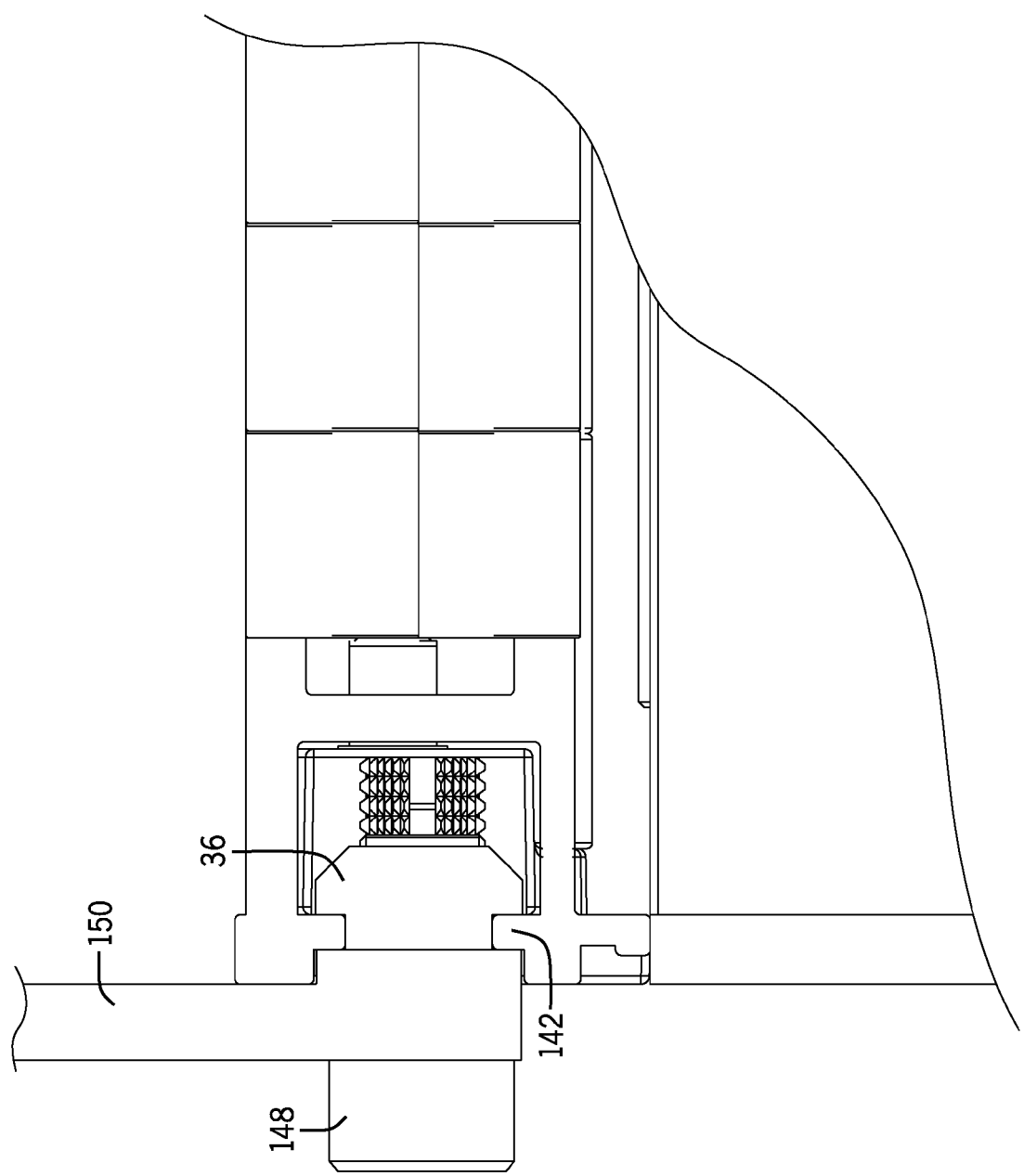
FIG. 11 is a side view illustrating the mounting of a T-slot connector in accordance with the present disclosure.

FIGS. 9-11 illustrate a flush mounted idler tail 120 of the present disclosure. The idler tail 120 includes a lower end roller 122 and an upper end roller 124 that are mounted between a pair of side brackets 126 that are each in turn mounted to a support arm 128, as shown in FIG. 2. The upper and lower end rollers 122, 124 can each be segmented rollers that are mounted between an intermediate bracket 130.

When the idler tail 120 is mounted to the end of the conveyor frame, the support arm 128 is received within the open mounting slot 34 formed in the side frame member 14. As illustrated in FIG. 2, a locking plate 132 is attached to the support arm 128 by a series of connectors 134. The connectors 134 attach the locking plate 132 to the support arm 128. When the idler tail 120 is installed as shown in FIG. 9, the locking plate 132 is flush with an outer surface 136 of the side rail 14.

As illustrated in FIG. 10, the outer face 136 includes a pair of inner edges 138 that define a width of a receiving channel 140. The receiving channel 140 is defined at a back edge by the shoulder 142. The shoulder 142 in turn defines an access opening 144 through a receiving cavity 146. The receiving cavity 146 receives one or more of the support blocks 36, as illustrated in FIG. 11. The support blocks 36 include an internal threaded bore that receives either one of the connectors 134 shown in FIG. 9 or a similar connector 148. The connector 148 shown in FIG. 11 is used to attach a support bracket 150 while the connectors 134 are used to secure the support arm to the locking plate 132. Referring now to FIG. 11, when the connector 148 is tightened, the connector pulls the support block 36 into contact with the pair of shoulders 142. The pair of shoulders 142 prevent rotation of the support block such that a single connector 148 can be used to secure the bracket 150.

When the idler tail 120 is installed as shown in FIG. 9, the locking plate 132 and the support arm are positioned on opposite sides of the shoulder 142. The connectors 134 pull these two components together to lock the idler tail 120 in a desired location.

Figure 12:
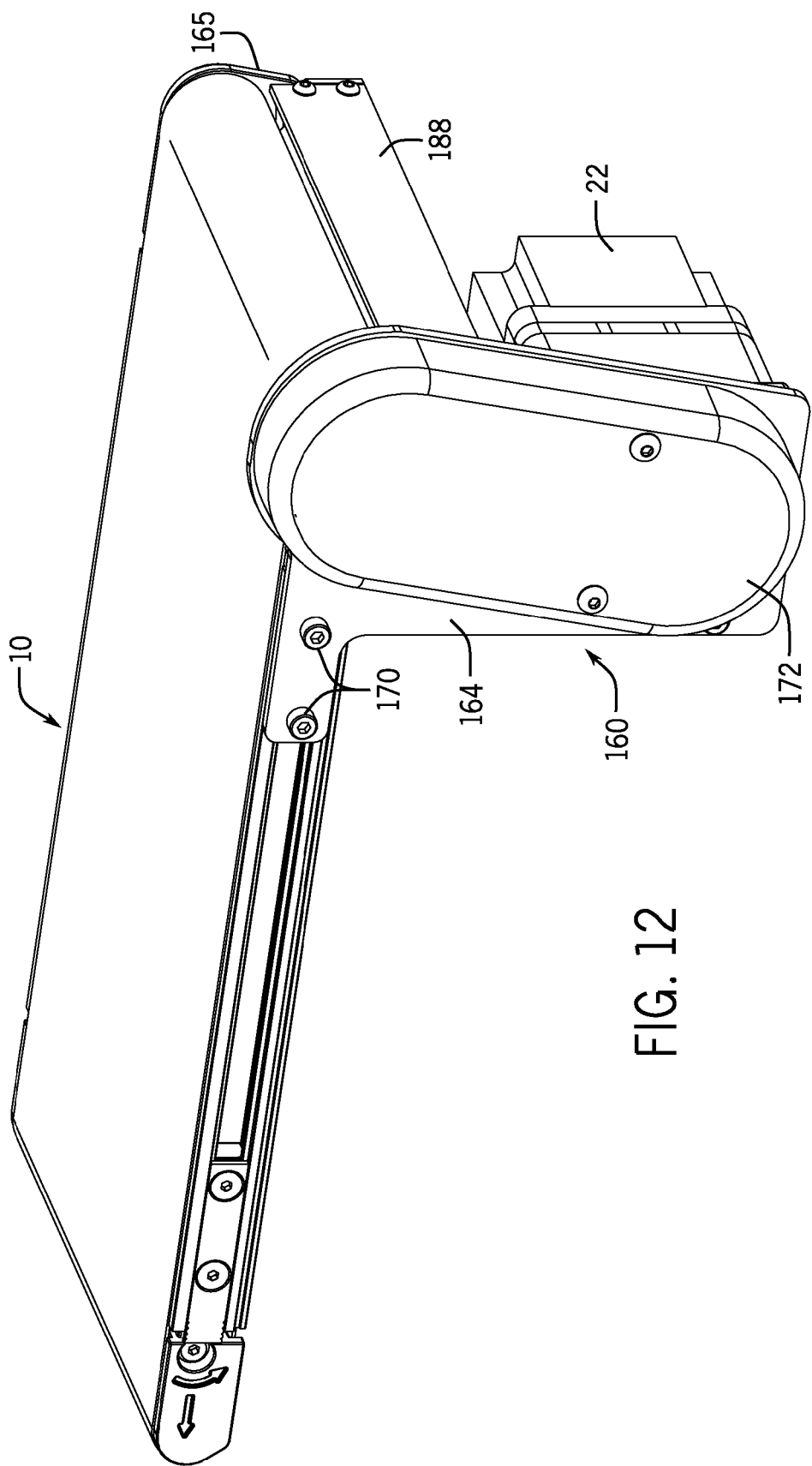
FIG. 12 is an isometric view of an alternate end mounting arrangement for the pinch roller drive assembly.
Figure 13:
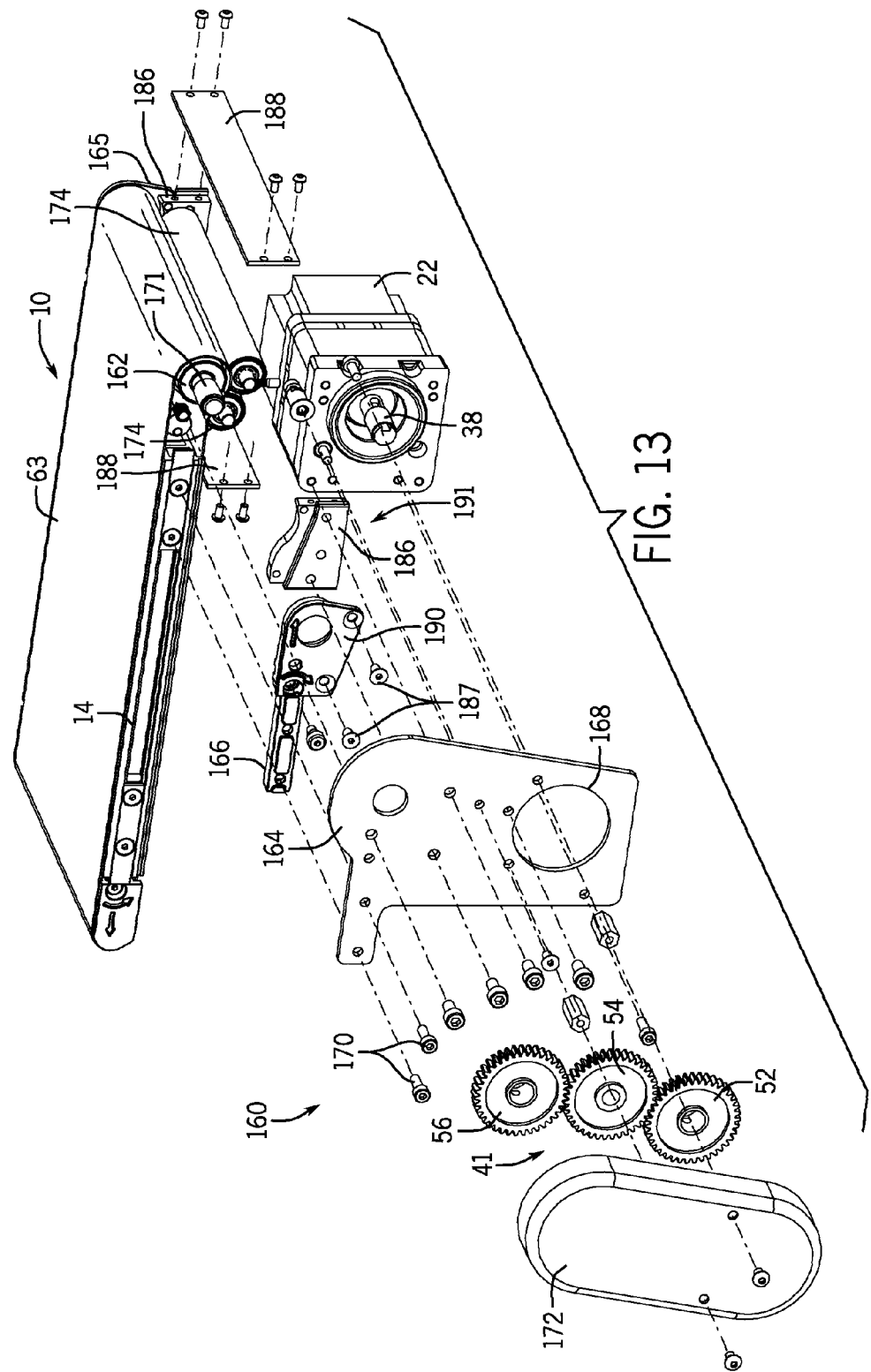
FIG. 13 is an exploded isometric view illustrating the end mounted pinch roller drive assembly in its disassembled condition.
Figure 14:
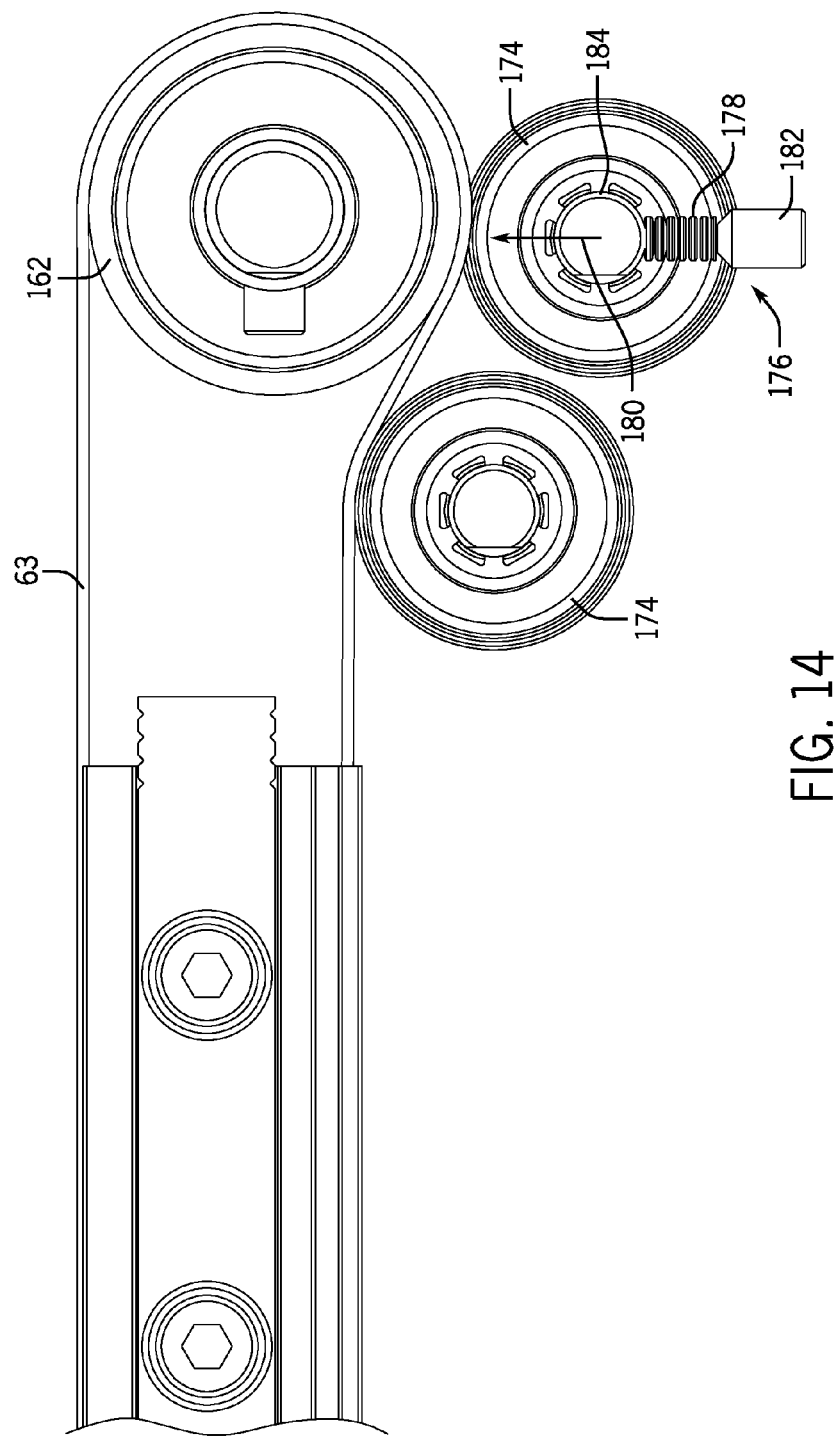
FIG. 14 is a magnified view illustrating, the bias force urging one of the pinch rollers into contact with the drive roller.

FIGS. 12-14 illustrate an alternate embodiment for the pinch roller drive assembly of the present disclosure. In the embodiment shown in FIG. 12, a pinch roller drive assembly 160 is mounted to one end of the conveyor assembly 10, rather than at an intermediate position, as illustrated in the previous embodiment.

Unlike the pinch roller drive assembly 20 shown in the preceding Figures, the pinch roller drive assembly 160 shown in FIGS. 12 and 13 is mounted to one end of the conveyor assembly 10. As shown in FIG. 13, a drive roller 162 is mounted to one end of the side rails 14 and receives the conveyor belt 63. The pinch roller drive assembly 160 includes a first mounting bracket 164 and a second mounting bracket 165 that are each attached to a support arm 166 through a pair of connectors 170. The mounting bracket 164, in turn, supports the drive motor 22 and includes an opening 168 that receives the drive shaft 38 of the drive motor 22. The drive shaft 38 extends through the opening 168 and is received by the first gear 52 of the gear assembly 41. The first gear 52 is mated with a second gear 54, which is in turn in mated relationship with the third gear 56. The third gear 56 receives the shaft 171 of the drive roller 162 to translate the rotational movement of the drive shaft 38 of the drive motor 22 to the drive shaft 171 of the drive roller 162. A cover member 152 covers the rotating gear assembly 41.

As with the first embodiment, the second embodiment of the pinch roller drive assembly 160 includes a pair of pinch rollers 174, at least one of which is biased into engagement with the outer surface of the drive roller 162. The biased arrangement of the pinch rollers 174 creates additional friction between the conveyor belt 63 and the drive roller 162 to aid in the chive roller moving the conveyor belt in either direction relative to the conveyor assembly 10.

Referring now to FIG. 14, one of the pinch rollers 174 is shown including a bias arrangement 176 that forces the pinch roller 174 into contact with the drive roller 162. The bias arrangement shown in FIG. 14 includes a bias spring 178 that exerts an upward bias force, illustrated by arrow 180, to press the outer surface of the pinch roller 174 into contact with the drive roller 162. The bias spring 178 is positioned between a mounting block 182 and the support shaft 184 of the pinch roller 174. The bias spring 178 urges the pinch roller 174 upward and into contact with the drive roller 162.

Referring back to FIG. 13, each of the pinch rollers 174 are rotatably supported by a support bracket 186. The support bracket 186 is mounted to the mounting plate 164 by a pair of connectors 187 to support the pair of pinch rollers 174 in the position illustrated.

Each of the support brackets 186 includes a pair of end faces that each receive one of a pair of guard plates 188. The guard plates 188 shield the rotating pinch rollers 174, as best illustrated in FIG. 12. As can be understood in FIG. 13, when the pair of connectors 187 are removed from each of the side brackets 190, the entire tension assembly 191 can be removed as a complete unit. Specifically, when the connectors 187 are removed, the pair of support brackets 186 drop down and away from the drive roller 162. Since each of the pinch rollers 174 are supported by the support brackets 186, downward movement of the support brackets 186 move the pinch rollers 174 away from the drive roller 162. The guard plates 188 are each attached between the pair of support brackets 186 and move with the pinch rollers 174. In this manner, tension can be removed from the conveyor belt and drive roller 162 by simply moving the entire tension assembly 191 downward, as described.

As illustrated in FIG. 13, the drive roller 162 is supported between a pair of side brackets 190 in a similar manner as described in the embodiment shown in FIGS. 9-11. The side brackets 190 each include the support arm 166 such that the side brackets can be adjustably positioned along the length of the side rails 18 to adjust the tension on the conveyor belt.

The second embodiment shown in FIGS. 12-14 provides an alternate configuration that allows a user to selectively position the drive motor 22 at one end of the conveyor assembly 10. The pinch roller drive assembly 160 utilizes the pinch rollers to force the conveyor belt into contact with the outer surface of the drive roller to enhance the driving capabilities of the conveyor assembly. Although the pinch roller drive assembly 160 is shown at one end of the conveyor assembly 10, it should be understood that the pinch roller drive assembly could be positioned at the opposite end of the conveyor assembly 10.

This written description uses examples to disclose the invention, including the best mode, and also to enable any person skilled in the art to make and use the invention. The patentable scope of the invention is defined, by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A drive assembly for a conveyor including a pair of spaced side rails each extending between a first end and a second end to support a driven conveyor belt, comprising:
    a drive roller positioned to receive the conveyor belt around at least a portion of its outer surface;
    a drive motor coupled to the drive roller to rotate the drive roller and move the conveyor belt; and
    a pair of belt tension assemblies supported along the side rails, each of the belt tension assemblies including a pinch roller, a swing arm having a first end that supports the pinch roller and a second end that is pivotally mounted to a support housing of the belt tension assembly, and a bias member,
    wherein the bias member exerts a bias force on the swing arm to press the pinch roller into contact with the drive roller.

2. The drive assembly of claim 1 wherein each of the belt tension assemblies are mounted between a pair of mounting plates, wherein the mounting plates and the drive roller are mounted to a pair of mounting brackets that are each supported on one of the side rails.

3. The drive assembly of claim 2 wherein the belt tension assemblies and the pair of mounting plates are removable as a single unit from the mounting brackets to release tension on the drive roller.

4. The drive assembly of claim 2 wherein the support housing is generally L-shaped and mounted to the mounting plates at an upper end and a lower end, wherein the support housing is pivotable relative to the mounting plates about the lower end when the upper end is disconnected from the mounting plates.

5. The drive assembly of claim 1 wherein the bias member is a bias spring connected between the swing arm and the support housing.

6. The drive assembly of claim 1 wherein the drive roller is positioned below the pair of spaced side rails and between the first and second ends of the side rails.

7. The drive assembly of claim 2 wherein the drive motor is supported by the pair of mounting brackets.

8. The drive assembly of claim 7 further comprising a gear assembly supported by the mounting brackets and positioned between the drive motor and the drive roller.

9. A conveyor assembly comprising;
    a pair of spaced side rails each extending between a first end and a second end;
    a conveyor belt supported between the pair of side rails;
    a drive roller positioned to receive the conveyor belt around at least a portion of its outer surface;
    a drive motor coupled to the drive roller to rotate the drive roller and move the conveyor belt; and
    a pair of belt tension assemblies each joined to a pair of mounting plates that are each supported along the side rails, each of the belt tension assemblies including a pinch roller and a bias member that exerts a bias three on the pinch roller to press the pinch roller into contact with the drive roller,
    wherein the pair of mounting plates and the pair of belt tension assemblies are removable as a single unit to release tension on the drive roller.

10. The conveyor assembly of claim 9 wherein each of the mounting plates are mounted between a pair of mounting brackets that are each supported on one of the side rails, wherein the mounting brackets support the drive roller.

11. The conveyor assembly of claim 10 wherein the belt tension assemblies each include a swing arm having a first end that supports the pinch roller and a second end that is pivotally mounted to a support housing of the belt tension assembly.

12. The conveyor assembly of claim 11 wherein each of support housings are each independently and rotatably mounted to the mounting, plates.

13. The conveyor assembly of claim 12 wherein the support housing is generally L-shaped and mounted to the mounting plates about an upper end and a lower end, wherein the support housing is pivotable relative to the mounting plates about the lower end when the upper end is disconnected from the mourning plates.

14. The conveyor assembly of claim 9 wherein the drive motor, the drive roller and the belt tension assemblies are positioned at one end of the side rail.

15. A drive assembly for a conveyor including a pair of spaced side rails each extending between a first end and a second end, the conveyor belt movably supported between the pair of side rails, comprising:
    a drive roller positioned to receive the conveyor belt around at least a portion of its outer surface;
    a drive motor coupled to the drive roller to rotate the drive roller;
    at least one belt tension assembly mounted between a pair of mounting plates supported by the side rails, the belt tension assembly including a pinch roller and a bias member that exerts a bias force on the pinch roller to press the pinch roller into contact with the drive roller, wherein the pair of mounting plates and the belt tension assembly are removable as a single unit to release tension on the drive roller.

16. The drive assembly of claim 15 wherein the drive roller is positioned below the pair of spaced side rails at the first end of the side rails.

17. The drive assembly of claim 15 wherein the bias member includes a bias spring to urge the pinch roller into contact with the drive roller.

18. The drive assembly of claim 15 wherein each of the mounting plates is supported between a pair of side brackets that are movable along the length of the side rails.

* * * * *